United States Patent [19]

Irwin

[11] 4,232,144
[45] Nov. 4, 1980

[54] POLYESTER WHICH EXHIBITS ANISOTROPY IN THE MELT CONTAINING P-OXYBENZOYL UNITS AND 4-OXY-3'-CARBONYLBENZOPHENONE UNITS OR METHYL AND CHLORO DERIVATIVES OF SAID UNITS

[75] Inventor: Robert S. Irwin, Wilmington, Del.

[73] Assignee: E. I. Du Pont de Nemours and Company, Wilmington, Del.

[21] Appl. No.: 76,797

[22] Filed: Sep. 17, 1979

[51] Int. Cl.³ .................... C08G 8/02; C08G 63/60
[52] U.S. Cl. .................................. 528/128; 528/125; 528/191; 528/193
[58] Field of Search ................ 528/125, 128, 191, 193

[56] References Cited

U.S. PATENT DOCUMENTS

| | | | |
|---|---|---|---|
| 3,531,435 | 9/1970 | Wear | 528/125 |
| 4,067,852 | 1/1978 | Calundann | 528/193 |
| 4,083,829 | 4/1978 | Calundann et al. | 528/193 |
| 4,130,545 | 12/1978 | Calundann | 260/40 P |
| 4,161,470 | 7/1979 | Calundann | 260/40 P |

*Primary Examiner*—Lester L. Lee

[57] ABSTRACT

Fiber-forming aromatic polyester consisting essentially of p-oxybenzoyl units or the 3-methyl or 3-chloro derivatives thereof, 4-oxy-3'-carboxybenzophenone units or the 3-methyl or 3-chloro derivatives thereof, 1,4-dioxyphenylene and terephthaloyl units.

16 Claims, No Drawings

POLYESTER WHICH EXHIBITS ANISOTROPY IN THE MELT CONTAINING P-OXYBENZOYL UNITS AND 4-OXY-3'-CARBONYLBENZOPHENONE UNITS OR METHYL AND CHLORO DERIVATIVES OF SAID UNITS

BACKGROUND OF THE INVENTION

1. Field of the Invention

This invention relates to fiber-forming melt-spinnable aromatic polyesters and to filaments thereof having good tenacity and high modulus.

2. Description of the Prior Art

A class of aromatic polyesters that form optically anisotropic melts from which oriented filaments can be melt spun has been described in Schaefgen et al. U.S. Pat. No. 4,118,372. Most polyesters which are disclosed in this patent are derived primarily from para-oriented dihydric phenols and para-oriented dicarboxylic acids. Filaments that are melt-spun from such polyesters can be heat treated to high tenacity and modulus. Other polyesters are disclosed in the aforementioned Schaefgen et al. patent which are copolymers derived from p-hydroxybenzoic acid, dihydric phenols and dicarboxylic acids.

Recent U.S. Pat. Nos. 4,067,852; 4,083,829; and 4,130,545 disclose polyesters consisting essentially of p-oxybenzoyl moieties, 2,6-dicarboxynaphthalene moieties and various other moieties. U.S. Pat. No. 4,130,545 refers to an application Ser. No. 832,147 which claims an aromatic polyester consisting essentially of p-oxybenzoyl moiety, 2,6-dioxynaphthalene moiety and terephthaloyl moiety. The present invention does not employ a 2,6-dioxynaphthalene moiety. Applicant has found that the new polyesters may be melt spun into filaments which upon heat treatment exhibit good tenacity and high modulus.

SUMMARY OF THE INVENTION

The present invention is directed to fiber-forming copolyesters that exhibit optical anisotropy in the melt and consist essentially of units I, II, III and IV having the structural formulas:

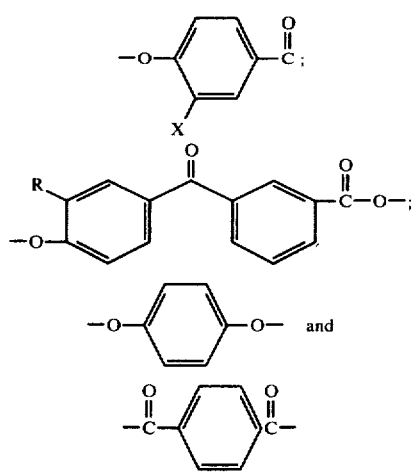

where X and R are independently hydrogen, methyl- or chloro-, in the proportions of about 56–70 mol % of Unit I, about 10–20 mol % of Unit II, from 7 to about 12 mol % of Unit III and with Unit IV in an amount equivalent on a molar basis to Unit III. Melt-spun and heat strengthened filaments of such polyesters are also included in the invention.

DETAILED DESCRIPTION OF THE INVENTION

The copolyesters of the invention consist essentially of units as described above. Unit I (p-oxybenzoyl) is derived from p-hydroxybenzoic acid, or the 3-methyl or 3-chloro- derivative thereof. Unit IV (terephthaloyl) is derived from terephthalic acid. Unit III (1,4-dioxyphenylene) is derived from hydroquinone. Unit II (4-oxy-3'-carbonylbenzophenone) is derived from 4-hydroxy-3'-carboxybenzophenone or the 3-methyl or 3-chloro derivative thereof. In place of such compounds one may usefully employ functional equivalents thereof as the reactants for preparing the copolyesters. The p-hydroxybenzoic acid reactant should be used in the form of an ester, preferably of its hydroxy group.

The reactants are generally combined in proportions corresponding to the molar proportions of the units desired in the copolyester products. The p-hydroxybenzoic acid reactant or methyl- or chloro-derivative thereof needed for Unit I should be reacted in an amount sufficient to supply from about 56 and 70 mol %, preferably about 60 mol %, of such units. When the upper or lower ends of the range are exceeded, there is a tendency towards polymer inhomogeneity. The reactant used to provide Unit II should be reacted in an amount sufficient to supply about 10 to 20 mol % of such units. The hydroquinone reactant should be used in an amount to provide from 7 to about 12 mol % of Unit III. A quantity of terephthalic acid reactant should be used to provide an amount of Unit IV equivalent to that of Unit III.

Conventional polymerization techniques may be employed such as described in the aforementioned U.S. Pat. No. 4,118,372 and more particularly in the examples described below. In general, a mixture of monomers (preferably with diphenols in the form of their diacetates in up to 5% excess) are heated with stirring, under nitrogen, in a 250 ml 3-necked flask in a Wood's metal bath from approximately 250° C. to 330°–380° C. Polymerization is continued for up to a total of 0.5 to one hour or longer if necessary until a fiber-forming molecular weight is reached but prior to excessive melt viscosity. Usually a vacuum is applied to obtain the final viscosity. The copolyesters of the invention exhibit optical anisotropy as determined by the thermooptical test (TOT) described in U.S. Pat. No. 4,118,372.

Filament Preparation

The (co)polyesters may be spun into filaments by conventional melt-spinning techniques. In the examples below filaments were prepared by melt-spinning into a quenching atmosphere of air or nitrogen and collected at a windup speed specified in the examples. The spinneret employed had 1 capillary, shaped as a right circular cylinder 0.23 mm in diameter and 0.46 mm long. "Melt temperature" is the temperature at which the melt was maintained (values in parentheses are temperatures of the spinnerets).

As used herein, the term "as-spun fiber" refers to a fiber which has not been drawn or heat treated after extrusion and normal windup.

Heat Treatment and Utility

Following collection, sample of undrawn (as-spun) filament (or yarn) were heat-treated relaxed in an oven. Heating was in stages in a nitrogen atmosphere. Typically, temperature was raised to 200° C. in 2 hrs, then to 304° C. in another 7 hrs, and finally maintained at 304° C. for an additional 7 hrs. Such a heating sequence if abbreviated as RT-200° C./2 hr+200°-304° C./7 hr+304° C./7 hrs.

The heat-treated fibers of this invention are useful for a variety of industrial applications such as plastic and rubber reinforcement.

Inherent viscosity ($\eta_{inh}$) was computed from $$\eta_{inh} = \ln(\eta_{rel})/C$$

where $\eta_{rel}$ is the relative viscosity and C is polymer concentration of 0.5 (i.e., 0.5 gm of polymer at 100 mL of solvent). Relative viscosity is the polymer solution to solvent ratio of flow times in a capillary viscometer at 25° C. The solvent employed was a mixture of 7.5% trifluoroacetic acid/17.5% methylene chloride/12.5% dichlorotetrafluoroacetone hydrate/12.5% perchloroethylene/50% 4-chlorophenol (all percentages by volume).

The copolyesters of this invention are anisotropic in the melt as determined using the thermoopitcal test (TOT) described in U.S. Pat. No. 4,118,372. The polymers were characterized by "stick temperature" meaning the temperature of a thermal-gradient hot bar at the point at which the polymer first began to stick.

Filament tensile properties were measured using a recording stress-strain analyzer at 70° F. (21.1° C.) and 65% relative humidity. Sample lengths were 1.0 in (2.54 cm), and rate of elongation was 60%/min. Results are reported as D/T/E/M or T/E/M where D is linear density in tex units, T is break tenacity in dN/tex, E is elongation-at-break expressed as the percentage by which initial length increased, and M is initial tensile modulus in dN/tex. Since linear density is normally substantially unchanged by heat-treatment, it is reported only once.

Filaments of this invention have good heat-treated tenacities and high initial moduli (e.g., about 200 dN/tex or greater). Tensile properties reported in the examples are averages. There was sometimes considerable scatter among individual measurements caused in some instances by occasional contact between filaments in a near-plastic condition which resulted in light fusing and sporadic defects in the fibers which were reflected in their tensile properties. Thus, the maximum single tenacity value is also listed separately as the presumed best indication of property potential.

Preparation of 4-Acetoxy-3'-Carboxybenzophenone

In sequence, 1,000 mL of carbon disulfide, 384 g (3.55 mole; 10% excess) of anisole, and 500 g (3.23 mole) of m-toluoyl chloride were placed in a 5 L flask, and the contents were cooled to about 10° C. Then 500 g AlCl₃ was added in small increments with stirring over a 3 hr period. The stirred mixture was kept at room temperature for 2 days during which 500 mL more of carbon disulfide was added by maintain fluidity. After adding ice-water to decompose the complex, carbon disulfide was removed by steam distillation and the product was extracted with methylene chloride. The extract was washed with water and then distilled at 170° C./1.2 mm Hg to yield 642 g of 4-methoxy-3'-methylbenzophenone. Half of the product (1.42 mole) was mixed with 1500 mL of pyridine and a solution of 75 g sodium hydroxide in 1500 mL of water. This mixture was heated to 80°-90° C. and 500 g potassium permanganate was added stepwise over a 4 hr period. Refluxing continued one more hour. Sludge was filtered out and washed well with hot water. Acidification of the filtrate yielded a precipitate of 4-methoxy-3'-carboxybenzophenone. After recrystallization from ethanol, melting temperature was 183°-186° C. A total of 392 g (1.53 mole) of so prepared 4-methoxy-3'-carboxybenzophenone was added to a premixture of 1150 mL of 48% HBr/575 mL acetic anhydride/575 mL acetic acid, and the mixture was refluxed for 15 hr. Pouring the contents into water precipitated 4-hydroxy-3'-carboxybenzophenone which, after filtration and drying, yielded 350 g (1.45 mole) of crude product. Mixing this product with 1050 mL of acetic anhydride containing 1.5 mL of concentrated sulfuric acid and heating for 30 min at 100° C. yielded 4-acetoxy-3'-carboxybenzophenone which was isolated by precipitation in excess ice-water, filtration, and drying. Recrystallization first from dioxane and then chloroform provided 4-acetoxy-3'-carboxybenzophenone melting at 190°-193° C.

Preparation of 3-Methyl-4-Acetoxy-3'-Carboxybenzophenone

The reaction was carried out in a sealed one-liter tube of Hastelloy Alloy C (Hastelloy is a registered trademark of Haynes Stellite Co. Alloy C is nickel-based containing 0.15% maximum of carbon, 13.0-16.0% chromium, 15.0-19.0% molybdenum, 3.5-5.5% tungsten, 4.0-7.0% iron, and the balance nickel). Into the tube were placed 27.0 g of o-cresol and 166 g of isophthalic acid. After cooling, 400 g of hydrogen fluoride and 51 g of boron trifluoride were also charged. The sealed tube was heated to 30° C. and maintained at that temperature during 4 hours of shaking. The product (after cooling and venting) was a pink-purple solid which was stirred with 2 L of water and recovered by filtration. This washing procedure was repeated before again stirring the solid in water and neutralizing to pH 8 with sodium hydroxide. Most of the solid dissolved and remaining solids were filtered off and discarded. Drops of concentrated HCl were added to the solution until a trace of precipitated solid persisted. Then 10 mL of HCl was added at once. After thorough stirring, the precipitate was recovered by filtration, washed with water, and air-dried. The product was a light orange solid melting at 222°-226° C. Nuclear magnetic resonance test indicated the presence of isophthalic acid.

About 20 g of the above impure 3-methyl-4-hydroxy-3'-carboxybenzophenone was treated with 100 mL of acetic anhydride in a 250 mL, 3-necked, round-bottom flask equipped with a reflux condenser and a stirrer. After adding 7 drops of concentrated H₂SO₄, the mixture was refluxed for 3 hours, filtered hot, and poured into ice water. On standing overnight, a pale yellow preceipitate formed which was collected and dried. It was dissolved in methyl alcohol, water was added until the solution turned milky, and the white crystalline product (m.p 146°-148° C.) was collected and dried. Gas chromatography indicated that less than 2% isophthalic acid was retained in the 3-methyl-4-acetoxy-3'-carboxybenzophenone.

The 3-chloro-4-acetoxy-3'-carboxybenzophenone may be obtained by similar reactions using o-chlorophenol in place of o-cresol.

Preparation of 3-Methyl-4-Acetoxybenzoic Acid

A mixture of 300 mL (2.82 mole) of o-cresol in 1700 mL distilled water, 720 g sodium hydroxide, and 8 g of activated copper powder was heated at reflux (about 80° C.) while dripping in 330 mL of carbon tetrachloride over 2 to 3 hrs. Refluxing continued another 6 hrs. After cooling to room temperature, acidity was adjusted to pH 8 using 38% hydrochloric acid and solids were filtered out. Acidity of the filtrate was then adjusted to pH 1 to precipitate the product which was filtered out and dried. The solids were washed with 2 liters of hot chloroform, refiltered, and redried. Recrystallization was from about 4 liters of water. After drying, the yield of 3-methyl-4-hydroxybenzoic acid was about 100 g (m.p. 169–171° C.). Acetylation to 3-methyl-4-acetoxybenzoic acid was accomplished by dissolving 93 g of the above product in 300 mL of acetic anhydride, adding 7 drops of concentrated sulfuric acid, and refluxing for 4 hrs. After filtration, the solution was poured onto ice, washed 5 times with 2000 mL of water each time, allowed to stand overnight, water washed again, and dried. After two recrystallizations from xylene, there were 57 g of 3-methyl-4-acetoxybenzoic acid melting at 149–151° C.

Synthesis of 3-Chloro-4-Acetoxybenzoic Acid

A solution was prepared from 100 g of the commercially available hemihydrate of 3-chloro-4-hydroxybenzoic acid in 300 mL of acetic anhydride. After adding 7 drops of concentrated sulfuric acid, the mixture was refluxed at 135° C. for 2 hrs. The product crystallized out on cooling. About 500 mL of cold water was added with stirring, which continued while cooling in an ice/water bath for 1 hr. After filtration and drying, the product was recrystallized from 350 mL of ethyl alcohol to yield 40 g of 3-chloro-4-acetoxybenzoic acid melting at 152–159° C.

EXAMPLES

The same general procedure was used in all the examples.

The monomer ingredients were added to a 3-necked flask in substantially the same molar ratios as desired in the final polymer except that an excess (usually 4 or 5%) of acylated diphenols was generally used. The resultant polymer is identified, for example, as

HBA/HCBP/HQ/TPA (60/20/10/10)

meaning it was prepared from 60 mol % 4-acetoxybenzoic acid, 20 mol % 4-acetoxy-3'-carboxybenzophenone, 10 mol % hydroquinone diacetate, and 10 mol % terephthalic acid (excesses of diacetates are not included in these percentages).

The 3-necked flask was fitted with: (1) a glass stirrer extending through a pressure-tight resin bushing, (2) a nitrogen inlet, and (3) a short Vigreux column leading to a water-cooled condenser with a flask for collecting acetic acid by-product. An attachment for application of vacuum was provided at the end of the condenser. An electrically heated Wood's metal bath mounted for vertical adjustment was used for heating. The reaction mixture was heated to increasing temperatures with stirring at atmospheric pressure under nitrogen purge until essentially all the acetic acid had evolved. Then, under a vacuum of usually about 0.027 kPa, heating was continued until viscosity had increased to a level believed satisfactory for melt-spinning. The cooled and solidified polymer was comminuted, and a portion was molded into a cylindrical plug for press-spinning.

EXAMPLE I

Filaments From Copolyesters From 4-Acetoxybenzoic Acid (HBA), 4-Acetoxy-3'-Carboxybenzophenone (HCBP), Hydroquinone Diacetate (HQ), and Terephthalic Acid (TPA)

Polymerization Ingredients

| | Grams Used | | | | Mole Ratios |
|---|---|---|---|---|---|
| Run | HBA | HCBP | HQ | TPA | HBA/HCBP/HQ/TPA |
| A | 17.71 | 8.2 | 2.89 (3%)* | 2.40 | 63/18.5/7.25/7.25 |
| B | 21.60 | 9.66 | 4.64 (4%) | 3.82 | 60/17/11.5/11.5 |

Polymerization Temperatures

| Run | Atmospheric Pressure | Vacuum |
|---|---|---|
| A | 270°–308° C./35 min | +308°–318° C./15 min |
| B | 276°–330° C./33 min | +330° C./6 min |

Polymer Characterizations

| Run | Inherent Viscosity | Stick Temp (°C.) |
|---|---|---|
| A | 0.84 | 255 |
| B | 0.99 | 284 |

Filament Extrusion

| Run | Melt Temp (°C.) Cell (Spinneret) | Winding Speed (m/min) | No. of Holes |
|---|---|---|---|
| A | 320 (320) | 549 | 1 |
| B | 335 (340) | 549 | 1 |

Heat Treatment

| Run | Cycle |
|---|---|
| A | RT-200° C./2 hr + 200°–304° C./7 hr + 304° C./7 hr |
| B | RT-200° C./2 hr + 200°–304° C./7 hr + 304° C./7 hr |

Tensile Properties

| Run | As-Spun D/T/E/M | Heat Treated T/E/M | Maximum T |
|---|---|---|---|
| A | 0.52/2.0/0.7/211 | 8.7/2.4/361 | 9.3 |
| B | 0.82/1.5/0.4/381 | 9.3/2.0/448 | 12.1 |

*( ) = % excess

Both filaments exhibited very high moduli after heat treatment. Averaged tenacities increased considerably on heat treatment.

EXAMPLE II

Filaments From Copolyesters From 3-Chloro-4-Acetoxybenzoic Acid (CHBA), 4-Acetoxy-3'-Carboxybenzophenone (HCBP), Hydroquinone Diacetate (HQ), and Terephthalic Acid (TPA)

Polymerization Ingredients

| | Grams Used | | | | Mole Ratios |
|---|---|---|---|---|---|
| Run | CHBA | HCBP | HQ | TPA | CHBA/HCBP/HQ/TPA |
| A | 12.87 | 5.05 | 2.32 (4%) | 1.91 | 60/17/11.5/11.5 |
| B | 13.52 | 4.12 | 2.32 (4%) | 1.91 | 63/14/11.5/11.5 |

Polymerization Temperatures

| Run | Atmospheric Pressure | Vacuum |
|---|---|---|
| A | 270°–366° C./25 min | + 366° C./2 min |
| B | 276°–380° C./35 min | + 380° C./3 min |

Polymer Characterizations

| | Inherent | Stick |

-continued

| Run | Viscosity | Temp. (°C.) |
|---|---|---|
| A | Insoluble | 280 |
| B | Insoluble | 320 |

Filament Extrusion

| Run | Melt Temp. (°C.) Cell (Spinneret) | Winding Speed (m/min) | No. of Holes |
|---|---|---|---|
| A | 345 (350) | 549 | 1 |
| B | 350 (350) | 549 | 1 |

Heat Treatment

| Run | Cycle |
|---|---|
| A-1 | RT-200° C./2 hr + 200°-304° C./7 hr + 304° C./7 hr |
| A-2 | RT-230° C./2 hr + 250° C./2 hr + 270° C./2 hr + 290° C./10 hr |
| B-1 | RT-200° C./2 hr + 200°-304° C./7 hr + 304° C./7 hr |
| B-2 | RT-230° C./2 hr + 250° C./2 hr + 270° C./2 hr + 290° C./10 hr |

Tensile Properties

| Run | As-Spun D/T/E/M | Heat Treated T/E/M | Maximum T |
|---|---|---|---|
| A-1 | 0.6/2.3/0.7/293 | 6.9/3.1/263 | 7.9 |
| A-2 | (same) | 7.5/2.4/386 | 8.0 |
| B-1 | 0.65/3.6/0.9/397 | 9.2/3.2/352 | 10.7 |
| B-2 | (same) | 8.5/2.3/421 | 9.8 |

Except for using CHBA in place of HBA, Run II-A duplicates Run I-B. Only slightly reduced tenacity and modulus result. Run II-B differs from Run II-A in that CHBA level is slightly increased and HCBP level correspondingly reduced. Slightly increased tenacity and modulus resulted. Runs II-A and II-B refer to two batches of filament from the same spin.

EXAMPLE III

Filaments From Copolyesters From
3-Methyl-4-Acetoxybenzoic Acid (MHBA),
4-Acetoxy-3'-Carboxybenzophenone (HCBP),
Hydroquinone Diacetate (HQ), and Terephthalic Acid
(TPA)

Polymerization Ingredients

| Run | Grams Used | | | | Mole Ratios MHBA/HCBP/HQ/TPA |
|---|---|---|---|---|---|
| | MHBA | HCBP | HQ | TPA | |
| A | 11.64 | 5.05 | 2.32 (4%) | 1.91 | 60/17/11.5/11.5 |
| B | 12.60 | 3.58 | 2.32 (4%) | 1.91 | 65/12/11.5/11.5 |

Polymerization Temperatures

| Run | Atmospheric Pressure | Vacuum |
|---|---|---|
| A | 270°-336° C./20 min | + 336° C./5 min |
| B | 276°-342° C./31 min | + 342°-352° C./5 min |

Polymer Characterizations

| Run | Inherent Viscosity | Stick Temp. (°C.) |
|---|---|---|
| A | 0.92 | 220 |
| B | 1.13 | 286 |

Filament Extrusion

| Run | Melt Temp. (°C.) Cell (Spinneret) | Winding Speed (m/min) | No. of Holes |
|---|---|---|---|
| A | 300 (310) | 549 | 1 |
| B | 340 (345) | 549 | 1 |

Heat Treatment

| Run | Cycle |
|---|---|
| A-1 | RT-200° C./2 hr + 200°-304° C./7 hr + 304° C./7 hr |
| A-2 | RT-230° C./2 hr + 250° C./2 hr + 270° C./2 hr + 290° C./10 hr |
| B-1 | RT-200° C./2 hr + 200°-304° C./7 hr + 304° C./7 hr |
| B-2 | RT-200° C./2 hr + 250° C./2 hr + 270° C./2 hr + 290° C./10 hr |

-continued

Tensile Properties

| Run | As-Spun D/T/E/M | Heat Treated T/E/M | Maximum T |
|---|---|---|---|
| A-1 | 0.56/3.3/0.8/399 | 10.6/3.1/415 | 16.1 |
| A-2 | (same) | 10.8/3.1/440 | 12.2 |
| B-1 | 0.48/3.6/0.9/378 | 7.4/2.1/399 | 9.5 |
| B-2 | (same) | 6.0/1.6/396 | 6.6 |

All products exhibited very high moduli. Tenacities for III-A were very good and somewhat better than for III-B.

EXAMPLE IV-CONTROL

Filaments From Polyester Obtained by Substitution of Resorcinol Diacetate (RE) for Hydroquinone Diacetate (HQ) in the Runs of EXAMPLE I Two polymers were prepared substantially as described in Example I except for substitution of RE for HQ. The resultant polymers were:

| A | HBA/HCBP/RE/TPA | (63/17/10/10) |
| B | HBA/HCBP/RE/TPA | (60/20/10/10) |

Both polymers were anisotropic in the melt and spun very well. Tensile properties of the heat treated filaments, however, were relatively poor in that moduli and tenacities were low and elongations high.

| Run | Heat Treated T/E/M | Maximum T |
|---|---|---|
| A | 4.1/5.5/76 | 4.9 |
| B | 5.7/7.7/157 | 6.3 |

EXAMPLE V

Filaments From Copolyesters From 4-Acetoxybenzoic Acid (HBA),
3-Methyl-4-Acetoxy-3'-Carboxybenzophenone (MHCBP), Hydroquinone Diacetate (HQ), and Terephthalic Acid (TPA)

Polymerization Ingredients

| Run | Grams Used | | | | Mole Ratios HBA/MHCBP/HQ/TPA |
|---|---|---|---|---|---|
| | HBA | MHCBP | HQ | TPA | |
| A | 10.8 | 5.06 | 2.33 | 1.91 | 60/17/11.5/11.5 |
| B | 10.8 | 5.96 | 2.03 | 1.66 | 60/20/10/10 |

Polymerization Temperatures

| Run | Atmospheric Pressure | Vacuum |
|---|---|---|
| A | 270°-340° C./26 min. | + 340°-352° C./6 min |
| B | 270°-346° C./25 min. | + 346°-350° C./1 min |

Polymer Characterizations

| Run | Inherent Viscosity | Stick Temp. (°C.) |
|---|---|---|
| A | 1.03 | 250 |
| B | 1.32 | 210 |

Filament Extrusion

| Run | Melt Temp. (°C.) Cell (Spinneret) | Winding Speed (m/min) | No. of Holes |
|---|---|---|---|
| A | 330 (332) | 549 | 1 |
| B | 314 (318) | 549 | 1 |

Heat Treatment

-continued

| Run | Cycle |
|---|---|
| A-1 | RT-200° C./2 hr + 200°-304° C./7 hr + 304° C./7 hr |
| A-2 | RT-230° C./2 hr + 250° C./2 hr + 270° C./2 hr + 290° C./10 hr |
| B-1 | RT-200° C./2 hr + 200°-304° C./7 hr + 304° C./7 hr |
| B-2 | RT-230° C./2 hr + 250° C./2 hr + 270° C./2 hr + 290° C./10 hr |

Tensile Properties

| Run | As-Spun D/T/E/M | Heat Treated T/E/M | Maximum T |
|---|---|---|---|
| A-1 | 0.7/3.8/1.2/356 | 9.6/2.4/273 | 10.0 |
| A-2 | (same) | 9.0/2.5/395 | 10.8 |
| B-1 | 0.8/1.8/0.6/292 | 6.4/2.8/281 | 8.2 |
| B-2 | (same) | 9.4/2.8/324 | 11.4 |

Run V-A should be compared with Run I-B. It is seen that results using the methyl-substituted HCBP in place of HCBP are comparable. The altered ingredients ratios for Run V-B had minimal effect on final tensile properties.

I claim:

1. Fiber-forming copolyesters consisting essentially of Units I, II, III and IV having the structural formulas:

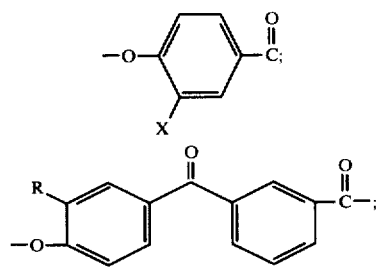

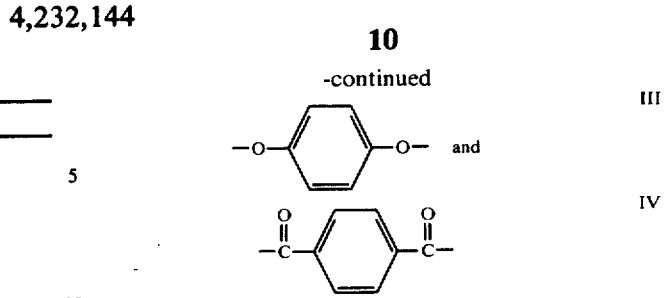

where X and R are independently hydrogen, methyl- or chloro-, in the proportions of about 56–70 mol % of Unit I, about 10–20 mol % of Unit II, from 7 to about 12 mol % of Unit III and an amount of Unit IV equivalent on a molar basis to Unit III.

2. A filament of copolyester of claim 1.
3. A fiber-forming copolyester according to claim 1 wherein Unit I is present in an amount of about 60 mol %.
4. A filament of a copolyester of claim 3.
5. A fiber-forming copolyester according to claim 1 wherein Unit I is p-oxybenzoyl.
6. A fiber-forming copolyester, according to claim 1 wherein Unit I is 3-chloro-p-oxybenzoyl.
7. A fiber-forming copolyester according to claim 1 wherein Unit I is 3-methyl-p-oxybenzoyl.
8. A fiber-forming copolyester according to claim 1 wherein Unit II is 3-chloro-4-oxy-3'-carbonylbenzophenone.
9. A fiber-forming copolyester according to claim 1 wherein Unit II is 3-methyl-4-oxy-3'-carbonylbenzophenone.
10. A fiber-forming copolyester according to claim 1 wherein Unit II is 4-oxy-3'-m-carboxybenzophenone.
11. A filament of the copolyester of claim 5.
12. A filament of the copolyester of claim 6.
13. A filament of the copolyester of claim 7.
14. A filament of the copolyester of claim 8.
15. A filament of the copolyester of claim 9.
16. A filament of the copolyester of claim 10.

* * * * *